Jan. 5, 1937. A. C. GULLIVER Re. 20,228

SHOVELING HAND TRUCK AND THE LIKE

Original Filed April 10, 1935

Inventor

Arthur C. Gulliver,

By D. P. Wolhaupter, his Attorney

Reissued Jan. 5, 1937

Re. 20,228

UNITED STATES PATENT OFFICE 20,228

SHOVELING HAND TRUCK AND THE LIKE

Arthur Charles Gulliver, London, England

Original No. 2,026,310, dated December 31, 1935, Serial No. 15,669, April 10, 1935. Application for reissue July 7, 1936, Serial No. 89,414

6 Claims. (Cl. 37—130)

This invention relates to hand-trucks, wheelbarrows and the like.

One object of the invention is to provide a hand-truck or the like comprising a receptacle which has handles and which is pivotally mounted towards its front edge on a frame which frame more rearwardly is mounted on ground wheels and extends beyond the back of the receptacle to form a treadle or foot rest, said parts being so arranged that the barrow can be pushed by the handles as a shovel, lifted for transport by depressing the handles and discharged by pushing down the treadle and lifting the handles.

The frame carrying the pivots or trunnions comprises the chassis frame of the hand-truck or the like and the fulcrum therefor comprises the axle or axles carrying the travelling wheels. Tre receptacle (or shovel) is provided with rearwardly directed handles and is filled by a person pushing a shovel-like or fork-like end of the receptacle into the material to be transported and then pressing downwardly on the handles to tilt the bottom of the receptacle in such a manner that the material, which may be coal, coke, sand, garden refuse, and the like, falls towards the rear of the receptacle. When the material has been taken to the tipping point the user presses the rear end of the chassis frame down with a foot and the chassis frame turns about the wheel centers, thereby lifting the forward end of the receptacle. The user whilst still depressing the rear of the chassis frame lifts the handles and so discharges the receptacle, the shovel-like end remaining out of contact with the ground and such material as may pile up, owing to the said ends having been raised, and the truck or the like resisting any tendency to movement owing to the depressed part of the chassis frame being in contact with the ground during the tipping operation.

The invention will now be described with reference to the accompanying drawing.

Figure 1:
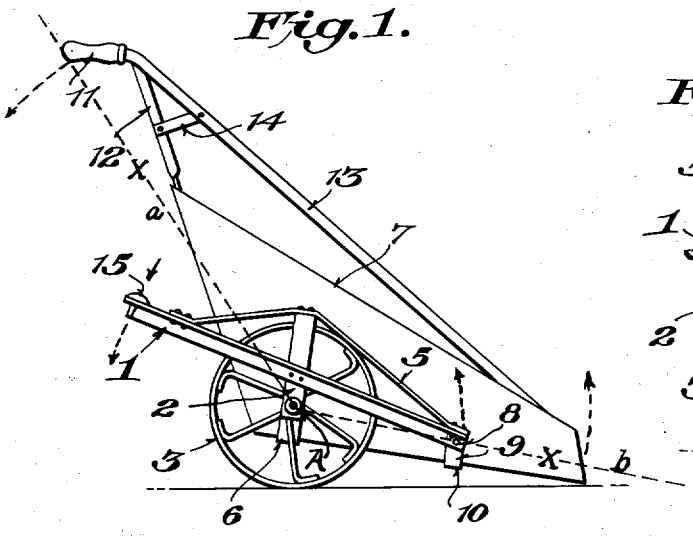
Figure 1 is a side elevation of the present barrow in "shoveling" position.
Figure 4:
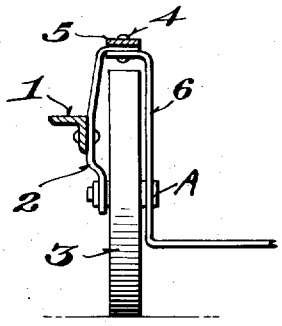
Figure 4 is a fragmentary view, on an enlarged scale, showing a wheel mounting and part of a stirrup.

In the drawing the carriage or chassis comprises an angle bar 1 of horse-shoe shape riveted between the ends of its limbs to two metal strips 2 extending upwardly and downwardly of the said limbs and secured at their lower ends to the axles, A, of wheels 3. The upper ends of the strips 2 are bent inwardly and riveted at 4 to ties 5 and the outwardly directed ends of a stirrup 6. The ties besides their function as such act as mudguards.

The receptacle 7 is open at its top and forward end and at a point about one third of its length from the front, and a little higher than its bottom, is attached to the chassis by pivots or bolts 8 located at the outer ends of the limbs of the angle bar and entering holes in the up-turned ends 9 of a strap 10 extending transversely across the bottom of the receptacle. The receptacle is provided with handles such as 11 connected to it by means of metal bars such as 12 and 13 arranged at opposite sides of the receptacle and braced by a metal cross-bar having rearwardly turned ends such as 14 riveted to the bars 12 and 13.

The barrow is filled by a user forcing the front edge into the material to be transported and then depressing the handles 11 to lift the said edge upwardly and allow the material to fall towards the rear of the receptacle.

During transport the handles are depressed to keep the angle bar substantially horizontal, the weight of the loaded receptacle being taken partly by the pivots 8 but mainly by the stirrup 6 which receives the rear end of the said receptacle.

When the tipping point is reached the user depresses the rear end of the chassis frame by treading on the roughened foot plate 15 so as to cause the frame to turn about the axis of the wheels 3 and lift the front part of the receptacle. Simultaneously with or after this action the user raises the handles 11 and the receptacle is discharged.

Owing to the fact that the user is treading on the back of the chassis frame he can, without fear of the barrow moving, exert maximum effort to tip the receptacle since engagement between the rear of the bar 1 and the ground holds the barrow against tendency to move.

In these operations of lifting the loaded receptacle from its shoveling position to a transporting position and in the tipping or unloading position a novel leverage action is involved which makes these operations easily performed without strain. This is one of the important features of the invention and involves a predetermined and effective leverage arrangement between the chassis and the receptacle.

The novel leverage arrangement referred to includes the chassis 1 which is a lever of the first class pivotally mounted or supported substantially midway of its length upon the wheel axles A which constitute the fulcrum therefor, while as indicated by the dotted lines $x$—$x$ on Fig. 1 of the drawing the receptacle 7 and its handle fittings is not only a lever of the first class but is of the bent or bell-crank type of lever. This bent lever (receptacle 7 and its handle fittings) has two fulcrum points, namely, on the axles A below the chassis and on the pivots 8 forwardly of the axles. Furthermore, it will be observed that the receptacle with its handle members 11 disposed a distance upwardly and rearwardly of the foot pedal part 15 of the chassis has its longer lever arm $a$ disposed rearwardly of the fulcruming axles A, while its shorter lever arm $b$ is disposed forwardly of the fulcruming axles A, thereby augmenting the moment of the power applied to the handles 11 when the latter are depressed for lifting the loaded receptacle from the ground to its transporting position.

Figure 2:
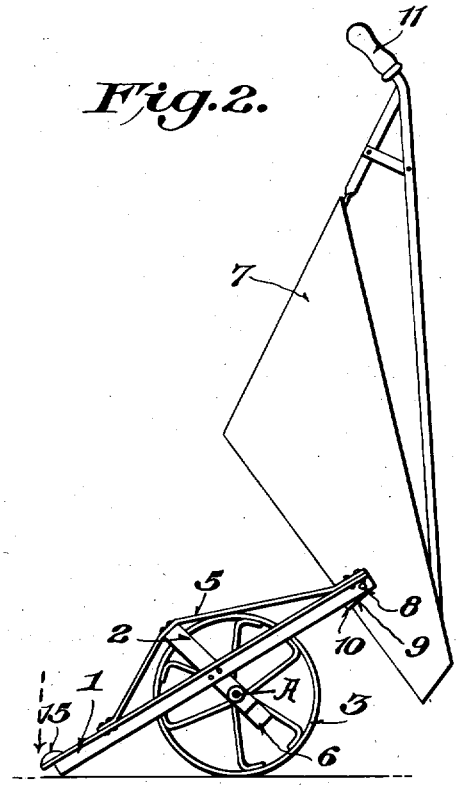
Figure 2 illustrates, in side elevation, the said barrow in tipping position.
Figure 3:
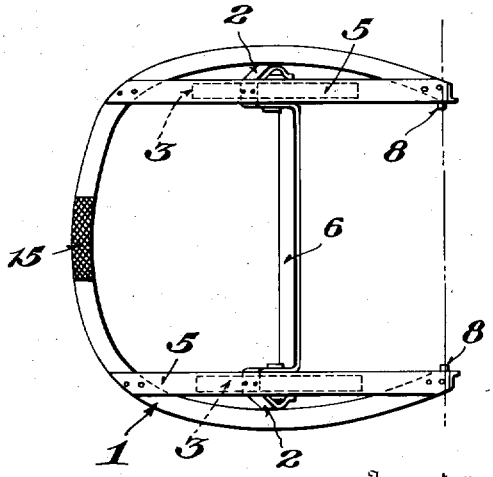
Figure 3 is a plan view of the carriage or chassis on which the receptacle is mounted.

It therefore will be understood that a practical feature of the invention resides in the combination of the two leverages represented by the pivotally mounted chassis 1 and the pivotally mounted receptacle to provide for ease and power in the lifting of the loaded barrow to its transporting position. In this operation the operator presses his foot downwardly on the foot member 15 of the chassis to communicate a lifting action beneath the forward part of the loaded receptacle through the cross strap 10 and simultaneously the operator presses downwardly upon the handle members 11 with the result of turning the receptacle on its fulcruming axles or pivots A, thus making it possible for persons of little strength to lift a heavily loaded receptacle to its transporting position. Likewise the combination of levers involved makes it possible to easily and readily tip or dump the barrow or receptacle as shown in Fig. 2 of the drawing by merely pressing the rear foot member 15 of the chassis downwardly into engagement with the ground while simultaneously moving the handles 11 upwardly and forwardly to rock the receptacle on its forward pivots 8.

The forward edge of the receptacle may be shod or may comprise or be provided with forks or tines according to the nature of the material to be transported and the side walls may terminate in a sharp angle at the forward edge.

What I claim is:—

1. A hand-truck designed for the easy shoveling and discharging of material, comprising a U-shaped frame, two ground wheels mounted one wheel adjacent to one limb of said frame and the other wheel adjacent to the other limb, said wheels having a common axis located transversely of said frame, a receptacle, said receptacle being pivotally attached to said frame adjacent to the outer ends of the limbs thereof and having an open front, and a receptacle-supporting element carried by said frame, said element being adapted to take the weight of said receptacle rearwardly of said pivotal attachment, whereby said receptacle and frame can be tilted on said wheels to enable said receptacle to be filled with a shoveling action through said open end, can be oppositely turned on said wheels to raise the forward end of said receptacle during transport, and the rear end of said frame can be depressed to raise said pivotal connection and the rear of said receptacle raised to turn said receptacle on said pivotal connection to discharge the receptacle.

2. A hand-truck comprising a frame, ground wheels supporting the truck intermediate its ends to permit bodily swinging movement of the frame, a receptacle open at its forward end, the receptacle being pivotally connected forward of its longitudinal center to the forward end of the frame, a stirrup secured at its ends to opposite members of said frame and arranged with its yoke parallel to the axis of the ground wheels, said stirrup receiving the rear of said receptacle to take the weight thereof when the receptacle is in the shoveling and transporting position, the rear end of the frame beng downwardly movable to raise the forward end of the receptacle for transport, the receptacle being movable on its pivotal connection with the forward end of the frame for dumping.

3. A hand-truck including ground wheels, a frame bodily swingable with respect to the axis of the ground wheels, an open-ended receptacle, pivot joints, said joints connecting said frame to said receptacle at points in advance of the middle of the receptacle, and means carried by the frame and extending between the ground wheels to underlie and support the receptacle near its rear end in a plane below the axis of the ground wheels, said means being wholly free of connection with the receptacle and supporting same normally to hold said open end thereof foremost, whereby the receptacle whilst being supported rearwardly of said joints and with its open end foremost can be filled with a shoveling action through said open end, can, together with said frame and still whilst supported by said means, be oppositely turned on said wheels to raise the forward edge of said foremost end during wheeling, and the rear of said frame can be depressed to raise said pivot joints and the rear of said receptacle can be raised to turn said receptacle on said joints to discharge it.

4. A hand-truck comprising a frame, ground wheels supporting the frame intermediate its ends to permit bodily swinging movement of the frame, a receptacle open at the forward end, pivotal connections between the frame and the receptacle forwardly of the ground wheels, and a supporting element to receive and support the receptacle rearwardly of the pivotal connection between the frame and receptacle, the supporting element engaging and supporting the frame on a plane below the axle of the ground wheels to thereby support the receptacle to normally maintain the lower edge of the open forward end of the receptacle in scraping contact with the ground surface, the rear end of the frame being movable to swing the supporting element and raise the pivotal connection between the frame and receptacle to raise the open forward end of the receptacle above the ground surface, the frame being further movable in the same direction to elevate the pivotal connection between the frame and receptacle to a position to permit dumping movement of the receptacle without contact with the ground surface.

5. A hand-truck of the class described including a tiltable wheeled frame having front and rear depressible portions, and an open front shoveling receptacle provided with a rearwardly extending handle member disposed a distance above the rear portion of the frame, the said receptacle with its handle being in the form of a bent lever having a fulcruming action at its angle on the wheel axles and also having its forwardly extending part pivotally connected with the front portion of the tiltable wheeled frame.

6. In a hand-truck of the class described including a tiltable wheeled frame having front and rear depressible portions, the rear of which portions is provided with a foot engaging member, and an open front shoveling receptacle provided with a rearwardly extending handle disposed above the rear portion of the wheeled frame, the said receptacle having its forwardly extending part pivotally connected with the front depressible portion of the wheeled frame and having its intermediate portion normally seated within the frame and projecting below the axles of the wheels, the said intermediate portion of the receptacle fulcruming on the wheel axles when the receptacle handle is depressed simultaneously with the depressing of the rear portion of the wheel frame to tilt the loaded truck from the ground to its transporting position.

ARTHUR CHARLES GULLIVER.